United States Patent

Billy

Patent Number: 5,632,162
Date of Patent: May 27, 1997

[54] CARBON MONOXIDE PRODUCTION PLANT INCORPORATING A CRYOGENIC SEPARATION UNIT

[75] Inventor: Jean Billy, Le Plessis Trevise, France

[73] Assignee: L'Air Liquide, Societe Anonyme Pour l'Etude et l'Exploitation des Procedes Georges Claude, Paris Cedex, France

[21] Appl. No.: 660,751

[22] Filed: Jun. 10, 1996

[30] Foreign Application Priority Data

Jun. 15, 1995 [FR] France .................................. 95 07160

[51] Int. Cl.$^6$ .................................................. F25B 3/00
[52] U.S. Cl. ........................... 62/636; 62/908; 62/920
[58] Field of Search ........................ 62/636, 920, 908

[56] References Cited

U.S. PATENT DOCUMENTS

| | | | |
|---|---|---|---|
| 3,340,695 | 9/1967 | Ichihara | 62/920 X |
| 3,355,859 | 12/1967 | Karwat | 62/636 X |
| 3,421,984 | 1/1969 | Jensen et al. | 62/636 X |
| 3,534,562 | 10/1970 | Thijssen | 62/636 |
| 4,891,950 | 1/1990 | Seufert et al. | 62/920 X |
| 5,069,038 | 12/1991 | Peinze | 62/636 |
| 5,351,491 | 10/1994 | Fabian | 62/920 X |

FOREIGN PATENT DOCUMENTS

| | | |
|---|---|---|
| 27 39 955 | 3/1978 | Germany . |
| 4325513 | 12/1994 | Germany ........ 62/920 |
| 35-2062177 | 5/1977 | Japan ........ 62/920 |
| 36-3247582 | 10/1988 | Japan ........ 62/920 |
| 40-5157447 | 6/1993 | Japan ........ 62/920 |

*Primary Examiner*—Christopher Kilner
*Attorney, Agent, or Firm*—Young & Thompson

[57] ABSTRACT

The plant comprises an adsorbent-filled tank (8) permanently interposed in the line (2), between the purification unit (3), operating by adsorption of solidifiable impurities from the gas mixture (5) containing carbon monoxide, and the cryogenic separation unit which delivers pure carbon monoxide at its outlet (6). The adsorbent in the tank (8), advantageously the same as the adsorbent in the adsorbers (4A, 4B) of the purification unit (3), has an affinity for carbon monoxide, thus making it possible to reduce the cyclic variations in the carbon monoxide production delivery rate which results from the cyclic operation of the adsorbers (4A, 4B) of the separation unit (3).

3 Claims, 1 Drawing Sheet

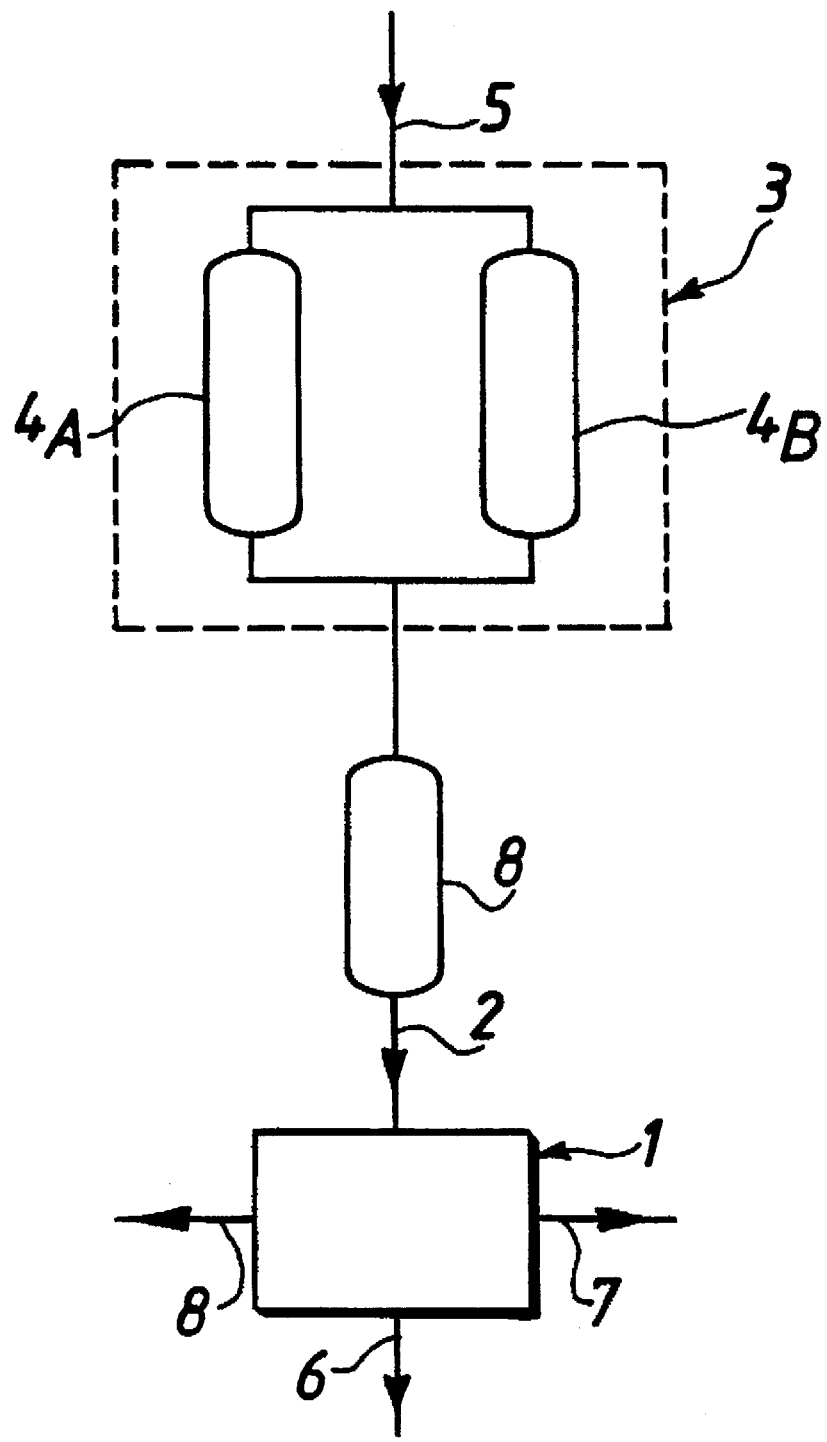

CARBON MONOXIDE PRODUCTION PLANT INCORPORATING A CRYOGENIC SEPARATION UNIT

The present invention relates to carbon monoxide production plants, of the type comprising a cryogenic separation unit supplied with a gas mixture containing carbon monoxide via a feed line incorporating a purification unit which adsorbs impurities and comprises at least two adsorbers.

Pure carbon monoxide is used in a number of processes in the chemical industry and is most often generated from hydrocarbons by steam reforming or partial oxidation, and is thus in a mixture with hydrogen and methane from which it is separated in a cryogenic separation unit. Cryogenic separation processes require that the gas mixture to be separated is free of any traces of solidifiable components, essentially water and carbon dioxide, such purification being effected by an adsorption-purification unit comprising adsorbers containing at least one solid adsorbent such as alumina, a silica gel or a molecular sieve. To various degrees, these adsorbents have some affinity for retaining carbon monoxide as well. Because of this, the cyclic operation of an adsorption-purification unit leads to a variation, which is also cyclic, in the delivery rate of the carbon monoxide production at the outlet of the cryogenic separation unit. The downstream user station, typically a chemical reactor, will not in general tolerate such variations, and so the carbon monoxide circuit is generally controlled by branching off and combusting some of the carbon monoxide production in order to smooth the production delivery rate, with the associated drawbacks of production losses and waste reprocessing.

The object of the present invention is to propose a plant which allows the simple, efficient and inexpensive regulation of the carbon monoxide production in such a plant, while greatly limiting production losses.

To this end, according to one characteristic of the invention, the plant includes a tank containing an adsorbent which has an affinity for carbon monoxide, this tank being permanently interposed in the feed line, between the purification unit and the cryogenic separation unit.

Other characteristics and advantages of the present invention will emerge from the following description of an embodiment, given by way of illustration but without implying any limitation, and made with reference to the appended drawing.

BRIEF DESCRIPTION OF THE DRAWING

The single Figure schematically represents a plant according to the invention.

This Figure schematically represents a cryogenic separation unit 1 supplied with a gas mixture to be separated via a line 2 connected to the production outlet of a purification unit 3 which comprises at least two adsorbers 4A, 4B operated alternately for purifying, by removal of solidifiable impurities, an input gas mixture 5 containing carbon monoxide. The cryogenic separation unit 1 comprises a pure carbon monoxide delivery line 6 and outlet lines 7 and 8, typically for hydrogen and residual gas mixture.

According to the invention, a tank 8 is permanently interposed in the line 2, this tank having similar dimensions to the adsorbers 4A, 4B and being filled with an adsorbent, advantageously the same adsorbent as the main adsorbent in the adsorbers 4B, typically a molecular sieve.

The way in which the plant according to the invention operates can be summarized as follows:

In continuous operation phase, the adsorbents of the adsorber 4A, 4B in service and of the tank 8 are saturated with carbon monoxide and are therefore "transparent" with respect to the latter. When the adsorbers 4A, 4B are switched over, when the recently regenerated adsorber starts to be used, it becomes saturated with carbon monoxide, whereas the adsorbent in the tank 8 discharges some of the carbon monoxide which it was holding. Conversely, when the adsorber which has recently started to be used reaches carbon monoxide saturation, the adsorbent in the tank 8 resaturates with carbon monoxide, with the result that, as mentioned, the cyclic variations in the carbon monoxide production delivery rate are substantially smoothed.

I claim:

1. In a carbon monoxide production plant, comprising a cryogenic separation unit supplied with a gas mixture containing carbon monoxide via a feed line incorporating a purification unit which adsorbs impurities and comprises at least two adsorbers; the improvement wherein the plant further comprises a tank containing an adsorbent which has an affinity for carbon monoxide, this tank being permanently interposed in the feed line between the purification unit and the separation unit.

2. Plant according to claim 1, wherein the adsorbent in the tank is the same as the one in the adsorber.

3. Plant according to claim 2, wherein the adsorbent is a molecular sieve.

* * * * *